July 20, 1943.  J. R. ORELIND ET AL  2,324,871
TRACTOR MOUNTED IMPLEMENT
Filed June 30, 1941   2 Sheets-Sheet 1
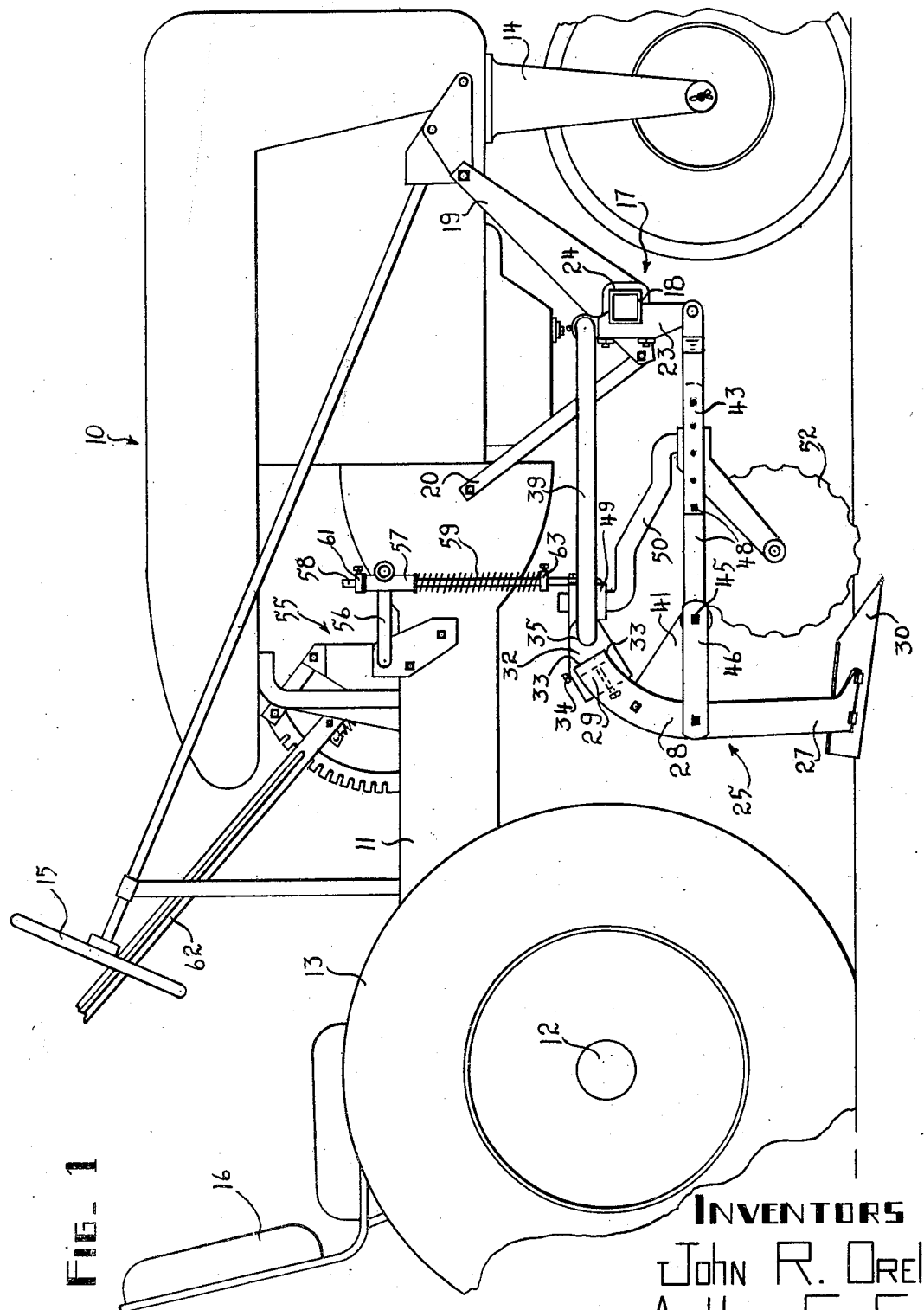
INVENTORS
John R. Orelind
Arthur G. Evans
BY Paul O. Pippel
ATTY July 20, 1943.  J. R. ORELIND ET AL  2,324,871
TRACTOR MOUNTED IMPLEMENT
Filed June 30, 1941  2 Sheets-Sheet 2
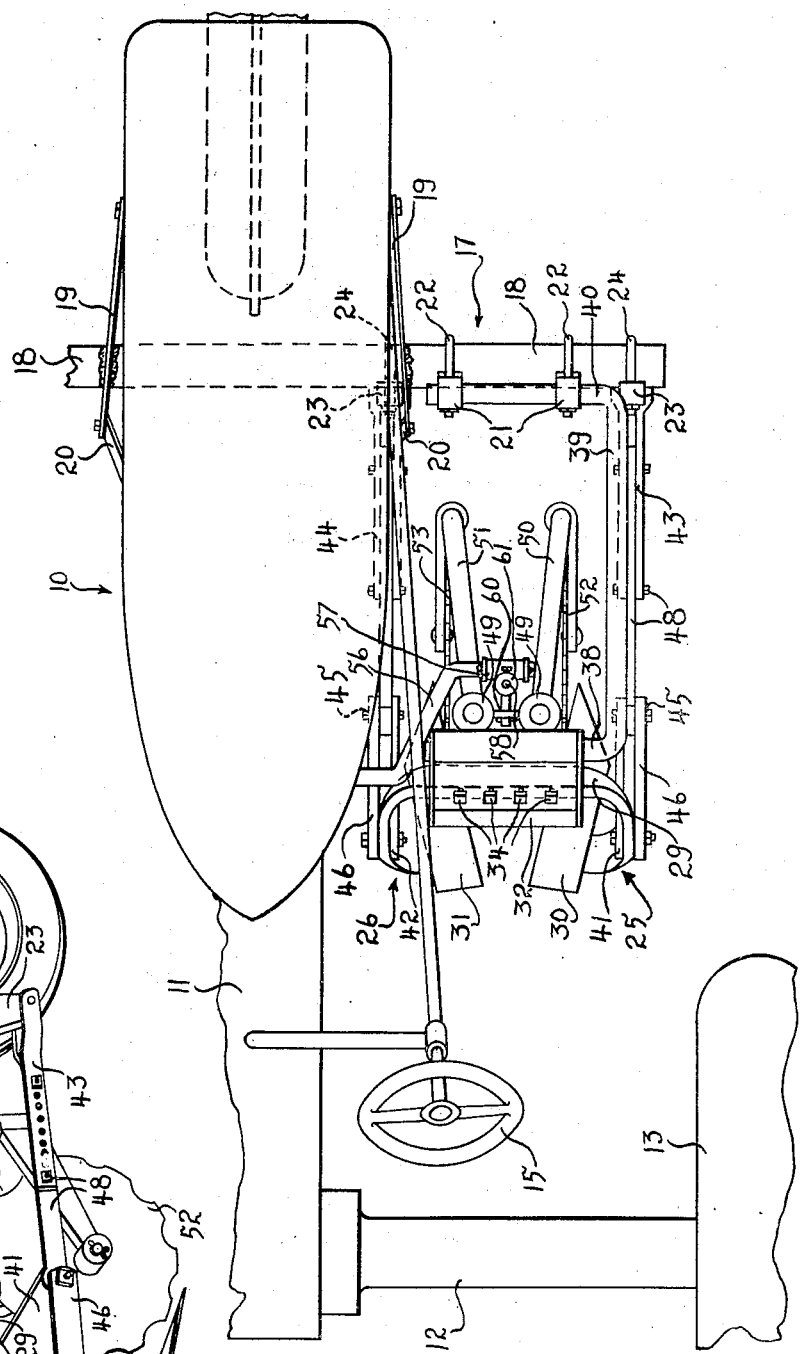
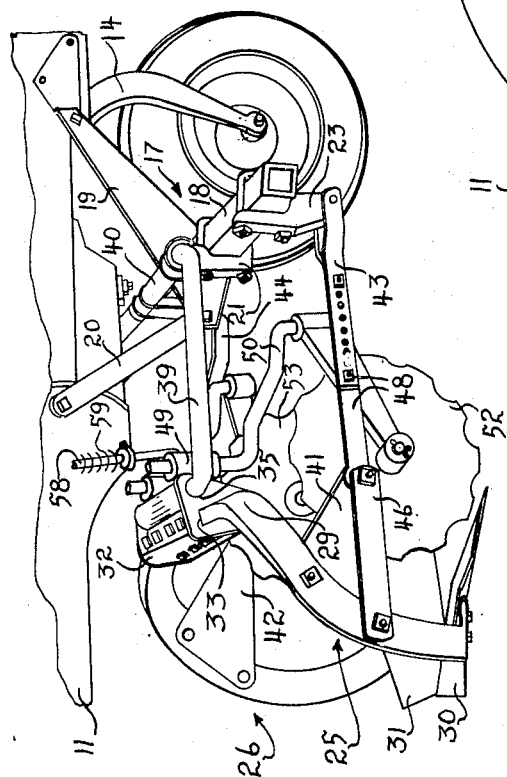
INVENTORS
John R. Orelind
Arthur G. Evans
By Paul O. Pippel
ATTY Patented July 20, 1943

2,324,871

UNITED STATES PATENT OFFICE 2,324,871

TRACTOR-MOUNTED IMPLEMENT

John R. Orelind, Evanston, and Arthur G. Evans, Canton, Ill., assignors to International Harvester Company, a corporation of New Jersey Application June 30, 1941, Serial No. 400,368

7 Claims. (Cl. 55—106)

This invention relates to tractor-mounted implements and more particularly to such implements as are used for the harvesting of sugar beets and the like.

It is an object of the invention to provide a beet harvesting tool adapted for connection to the side of a tractor which tool is of light weight and of simple construction.

It is another object of the invention to provide a beet pulling arrangement using parallel links for the connection of the same to the tractor, wherein these parallel links are directly connected to the tool standards and thereby provide a simplified though effective means for the connecting of beet tools to the tractor for vertical movement.

It is another object of the invention to provide one of the links used for the connecting of the tool standards with the tractor with means for laterally stabilizing the beet tools with respect to the tractor.

It is still another object of the invention to provide a single casting serving as a means for the connection of one of the links with the two beet standards and likewise as a support for the colter wheel standards.

According to the present invention, the respective tool standards are provided with lower, intermediate, and upper portions. The upper portion is arranged to be located in advance of the intermediate and lower portion to thereby permit the passage of the beets beyond the upper portions prior to the pulling operation, whereby the beets will be free of the structural parts prior to their being pulled. The tool standards are laterally spaced and are retained by means of a single casting connected to the respective upper portions of the tool standards. These upper portions extend transversely and are fitted within a laterally extending opening within the casting and can be adjusted laterally along this opening and there maintained by means of clamping screws. This single casting serves as a means for the attachment of the upper parallel link which is pivoted to the tool-supporting structure at its forward end. This upper link takes the form of a U-shaped member having transversely extending leg portions which operate in a transversely extending journal portion on the tool-supporting structure and in a transversely extending journal opening in the casting. This casting also serves as a support for the colter wheel standards. The intermediate portions have connected thereto a forwardly extending bracket to which is respectively connected a lower parallel link. The lower parallel link is of substantially the same length as the upper parallel link whereby the true effect of a parallel arrangement may be obtained. Since the upper portions on the tool standards are connected together, only a single link is used and this single link, as above mentioned, is so formed that it serves as a lateral stabilizer for the arrangement. There are three links in all, the upper link and two lower links, the latter being respectively connected to each of the two tool standards. The lower parallel links are adjustable to effect a change in the angle of entrance into the ground of the respective puller blades.

For other objects and for a better understanding of the invention, reference may be had to the following detailed description taken in conjunction with the accompanying drawings, in which:

Figure 1 is a view in elevation of a tractor with the beet pulling attachment embodying the features of the present invention connected thereto;

Figure 2 is a plan view of a portion of the tractor and of the beet pulling attachment; and, Figure 3 is a perspective view of the beet pulling attachment.

Referring now to the drawings, there is shown a tractor 10 having a longitudinally extending body portion 11 and a transversely extending rear axle structure 12 from which is driven the rear drive wheels 13. The tractor is supported at its forward end by means of a steerable wheel structure 14 adapted to be operated by the steering mechanism 15 from the operator's station 16 located on the transverse rear axle structure 12. Intermediate the forward steerable wheel structure and the rear drive wheels and connected to the longitudinally extending body portion 11 is a transversely extending tool bar structure, indicated generally at 17. This structure includes a transversely extending tool bar 18 which is retained on the tractor in its vertical position by strap members 19 and 20. There is a pair of these strap members at each side of the tractor, and the transverse tool bar 18 extends from a location on one side of the tractor to a location beyond the face of the other side of the tractor.

On the transverse tool bar 18 is connected a pair of upwardly extending brackets 21 laterally spaced along the tool bar and held in place by the clamping U-bolts 22. Also connected to the transverse tool bar and depending downwardly is a pair of laterally spaced brackets 23 maintained thereon by the clamping U-bolts 24. It should be apparent that since these brackets are attached by clamping bolts and the transverse tool bar 18 is of substantially uniform dimension throughout its length, the brackets may be adjusted to any lateral position along the transverse bar.

These brackets thus serve as a means for the attachment of the beet puller arrangement to the transversely extending tool bar structure 17. The tractor 10 taken with the transversely extending tool bar structure 17 thus serves as a tool-supporting structure for the beet puller arrangement.

To one side of the main body portion 11 on the tractor and in rear of the transversely extending tool bar structure 17 is disposed a pair of laterally spaced beet tool standards 25 and 26. These tool standards are so formed as to provide a lower portion 27, an intermediate portion 28, and an upper portion 29. The upper portion extends forwardly and in advance of the intermediate and lower portions. The intermediate portions are bowed laterally and in opposed relationship with respect to each other. On the lower portions are disposed respectively the beet puller blades 30 and 31. These blades are laterally spaced sufficiently to receive the beets and to effect a lifting operation upon them.

The upper portions 29 are formed to have a laterally extending part. These parts are retained by a casting 32 having a transversely extending opening 33 therethrough adapted to receive the transverse part of these upper portions. Once the transverse parts are inserted within the opening 33, they can be retained by clamping screws 34. These transverse parts are also adjustable in and out of the opening 33 and may be positioned depending upon the desired lateral spacing between the puller tools 30 and 31.

The casting 32 serves therefore to connect together the tool standards 25 and 26. Also extending through the casting 32 in advance thereof is a second transverse opening 35 which serves as a journal bearing portion for the connection of a transversely extending portion 38 of an upper link 39. This upper link 39 is substantially U-shaped and has a second transversely extending portion 40 as well as the portion 38. This transverse portion 40 is journaled in the upwardly extneding brackets 21. It should thus be apparent that in addition to the link 39 serving as a connection for the casting 32 with the tool-supporting structure that it will also serve as a lateral stabilizing means for the beet pulling arrangement. It should also be apparent that this transverse portion 40 and the casting 32 are a means common for the connection of the upper portions of both standards to the tool-supporting structure.

On the intermediate portion 28 on the respective tool standards 25 and 26, there is connected, respectively, bracket plates 41 and 42. These bracket plates extend forwardly and serve as a means for the connection of the intermediate portions of the tool standards to lower parallel links 43 and 44. These links 43 and 44 are in turn connected to the depending brackets 23. The links 43 and 44 are pivoted to said brackets, as indicated at 45, and as a means for making the connection more secure, there is provided in addition to the bracket plates 41 and 42 strap means 46 which runs coextensively with the bracket plates. It will be noted that the brackets 41 and the cooperating straps 46, extending forwardly to a location substantially below the casing 32, tend to permit the lower links 43 and 44 to be of substantially the same length as the upper link 39, whereby the desired parallel link effect may be had. In each of these links 43 and 44 is an adjusting means 48 whereby they may be lengthened. The lengthening of these links will effect a rotation of the puller blades about the transverse portion 38 of the upper link 39. This angular adjustment will change the angle of the points of entrances of the blades 30 and 31.

Extending forwardly from the casting 32 are standard retaining means 49 to which the standards 50 and 51 of the colter wheels 52 and 53, respectively, may be connected. It should thus be apparent that this casting likewise serves as a means for the connection of the arrangement to the colter wheel standards 50 and 51.

Since the upper portions 29 extend considerably forwardly of the lower portions or forwardly of the points along the blades to which the actual lifting of the beets is effected, the beet tops will be entirely free of the casting and upper portions before the actual pulling of the beets is effected. By having the standards so shaped, it will be apparent that the standards may be shorter than they ordinarily would have to be were they not so shaped. The advantages of being able to have the same shorter are that the material of the standards need not be so rugged, since the standards are not as long as they would have to otherwise be. Secondly, the tool standards are of shorter construction so that the same may be permitted to be located underneath the body portion of the tractor without the same being interfered with by the tractor upon being lifted to their transport position. It should now be apparent that the structure formed as already described is much more simple than if a supporting frame were provided for the tool standards. According to the present invention, connection is made direct with the tool standards and in effect there has thus been provided a simplified compact means for the connection of the tool standards to the tool-supporting structure.

Upon the longitudinally extending body portion 11 of the tractor at a location about midship of the same is provided a manually adjustable lifting means 55 having a laterally extending lifting arm 56 having a trunnion sleeve 57 pivoted thereon. Between this trunnion sleeve 57 and the casting 32 is connected a lifting rod 58 which may have a pressure spring 59 thereon. This lift rod 58 is connected, as indicated at 60, to the casting 32. On the upper end of the lift rod there is a collar 61 adapted to engage with the upper end of the trunnion sleeve 57. As the arm 56 is rotated in a counter-clockwise direction by an adjusting lifting lever 62, accessible to an operator's station 16 on the rear axle of the tractor, the pressure spring may react against the lower end of the trunnion sleeve 57 and against a collar 63 at the lower end of the lift rod 58.

While various changes may be made in the detail construction, it shall be understood that these changes shall be within the spirit and scope of the present invention as defined by the appended claims.

What is claimed is:

1. In combination, a tool-supporting structure, a pair of laterally spaced vertically extending tool standards, each of said standards having lower, upper, and intermediate portions, a working tool connected to a lower portion of each of the respective standards, and means for connecting the standards to the tool-supporting structure for vertical movement including a single casting serving to connect together the upper portions of the spaced tool standards and having a laterally extending opening therein, a single link connected to the tool-supporting structure for vertical pivotable movement but with means being provided to maintain the same against lateral movement with respect thereto, said link having a transversely extending portion fitted within said laterally extending opening whereby the standards are laterally stabilized, and links for connecting respectively the intermediate portions of the standards with the tool-supporting structure.

2. In combination, a tool-supporting structure, a pair of laterally spaced vertically extending tool standards, each of said standards having lower, upper, and intermediate portions, a working tool connected to a lower portion of each of the respective standards, and means for connecting the standards to the tool-supporting structure for vertical movement including a single casting serving to connect together the upper portions of the spaced tool standards and having a transverse journal opening, said tool-supporting structure having transversely extending journal portions, a bail-shaped link having transversely extending portions respectively journaled in the journal portions of the casting and of the tool-supporting structure whereby the standards are laterally stabilized, and links for connecting the intermediate portions of the standards with the tool-supporting structure.

3. In combination, a tool-supporting structure, a pair of laterally spaced vertically extending tool standards, each of said standards having lower, upper, and intermediate portions, a working tool connected to a lower portion of each of the respective standards, and means for connecting the standards to the tool-supporting structure for vertical movement including connecting means between upper portions of the respective standards to maintain the same in laterally spaced relationship, link means for connecting the said latter connecting means and the intermediate portions of the standards with the tool-supporting structure, colter wheels and their standards, and said connecting means between the upper portions of the standards serving as a support for the colter wheel standards.

4. In combination, a tool-supporting structure, a working tool standard having lower, upper, and intermediate portions, said tool standard so shaped that its upper portion is in advance of its lower and intermediate portions, a working tool carried on the lower portion of the standard, and means for connecting the standard to the tool-supporting structure including upper and lower links substantially parallel with respect to each other and each having a vertically swingable free end, means for connecting the free end of the upper link with the upper portion of the standard, a bracket structure connected to the intermediate portion of the standard and extending forwardly to a location immediately beneath the connection of the upper link with the upper portion, and the free end of the lower link connected to the forward end of the bracket structure, whereby the upper and lower links may be of substantially the same length to give thereby the desired effect of parallelism from the links.

5. In combination, a tool-supporting structure, a pair of vertically extending tool standards, each of which having lower, upper, and intermediate portions and so shaped as to have its upper portion extended in advance of its intermediate and lower portions, a working tool carried at the lower portion of each standard, means for connecting the upper portions of the respective standards together, a bracket structure connected to the intermediate portion of each standard and extending forwardly to a location immediately below the said connecting means, a single link between the connecting means and the tool-supporting structure, and links arranged substantially parallel with the upper link and of substantially the same length connected respectively between forwardly extending bracket structures of the respective tool standards and the tool-supporting structure.

6. In combination, a tool-supporting structure, a pair of vertically extending laterally spaced tool standards, each of which having an upper portion extending inwardly toward each other, a casting having means for the attachment thereto of the inwardly extending upper portions of the tool standards, puller blades respectively connected to the tool standards in opposing relationship with respect to each other, a single vertically swingable link for connecting the casting to the tool-supporting structure, and other links arranged substantially parallel with the single link for respectively connecting other portions of the standards with the tool-supporting structure, and said other links being adjustable to thereby serve as means for varying the angles of entrance of the respective puller blades with respect to the ground, the casting being thereby angularly adjusted about its connection with the single link.

7. In an earth-working implement for use upon a vehicular machine, laterally-spaced generally upright earth-working tool standards each having a lower end portion for carrying a tool and each also having an upper end portion and an intermediate portion, bridging means interconnecting said upper end portions of the standards and including a bearing, bearings respectively upon said intermediate standard portions generally below said bridging means bearing, and means for connecting said standards with the vehicle for vertical movement with respect thereto, comprising a bracket structure including spaced-apart bearing means and attachable to the vehicle with said bearing means vertically spaced, and upper and lower parallel link members of which an upper thereof extends between and has portions respectively in journaled relation with the bridging means bearing and the upper bearing means in said bracket structure and of which link members lower ones thereof extend between and have portions respectively in journaled relation with the intermediate standard portion bearings and the lower bearing means in the bracket structure.

JOHN R. ORELIND.
ARTHUR G. EVANS.